United States Patent
Ahn

(10) Patent No.: US 12,174,632 B2
(45) Date of Patent: Dec. 24, 2024

(54) MOBILE SECURITY ROBOT EQUIPPED WITH MICRO FLIGHT DEVICE AND CONTROL METHOD THEREOF

(71) Applicant: HL KLEMOVE CORP., Incheon (KR)

(72) Inventor: Jaewan Ahn, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 17/883,104

(22) Filed: Aug. 8, 2022

(65) Prior Publication Data

US 2023/0045483 A1     Feb. 9, 2023

(30) Foreign Application Priority Data

Aug. 6, 2021 (KR) .......................... 10-2021-0103767

(51) Int. Cl.
| | |
|---|---|
| *G05D 1/00* | (2024.01) |
| *B64C 39/02* | (2023.01) |
| *G05D 1/02* | (2020.01) |
| *G05D 1/10* | (2006.01) |
| *B64U 80/70* | (2023.01) |
| *B64U 101/30* | (2023.01) |

(52) U.S. Cl.
CPC ......... *G05D 1/0094* (2013.01); *B64C 39/024* (2013.01); *B64C 39/028* (2013.01); *G05D 1/021* (2013.01); *G05D 1/101* (2013.01); *B64U 80/70* (2023.01); *B64U 2101/30* (2023.01)

(58) Field of Classification Search
CPC ...... G05D 1/0094; G05D 1/021; G05D 1/101; G05D 2201/0207; G05D 1/0246; B64C 39/024; B64C 39/028; B64U 80/70; B64U 2101/30; B64U 80/25; B64U 80/86; B64U 2101/31; B64U 2101/00; B64U 50/19; B64U 50/34; B64U 2201/20; B25J 9/1674; B25J 5/005; B25J 9/1664; B25J 19/023

See application file for complete search history.

(56) References Cited

U.S. PATENT DOCUMENTS

| | | | |
|---|---|---|---|
| 2020/0341475 A1 * | 10/2020 | Matsuda | G08G 5/0013 |
| 2021/0046650 A1 * | 2/2021 | Deyle | G05D 1/246 |
| 2022/0005332 A1 * | 1/2022 | Metzler | G08B 13/1965 |
| 2022/0113744 A1 * | 4/2022 | Hong | G05D 1/101 |
| 2022/0197314 A1 * | 6/2022 | Tanaka | G05D 1/106 |

FOREIGN PATENT DOCUMENTS

| | | | | |
|---|---|---|---|---|
| CN | 111625013 A | * | 9/2020 | G05D 1/101 |

OTHER PUBLICATIONS

Machine Translation: CN-111625013-A (Year: 2020).*

* cited by examiner

*Primary Examiner* — Anne Marie Antonucci
*Assistant Examiner* — Connor L Knight
(74) *Attorney, Agent, or Firm* — Womble Bond Dickinson (US) LLP

(57) ABSTRACT

The present invention relates to a mobile security robot equipped with a micro flight device, which uses a camera mounted on the mobile security robot to patrol a predetermined area by the mobile security robot capable of autonomous driving and to patrol an area where the mobile security robot cannot move by the mounted micro flight device. Accordingly, there is an advantage in that it can efficiently patrol a much wider area compared to the patrol using only the mobile security robot.

13 Claims, 4 Drawing Sheets

MOBILE SECURITY ROBOT EQUIPPED WITH MICRO FLIGHT DEVICE AND CONTROL METHOD THEREOF

CROSS REFERENCE TO RELATED APPLICATION

The present application claims priority to Korean Patent Application No. 10-2021-0103767, filed Aug. 6, 2021, the entire contents of which is incorporated herein for all purposes by this reference.

BACKGROUND OF THE INVENTION

Field of the Invention

The present invention relates to a surveillance mobile robot capable of unmanned surveillance.

Description of the Related Art

With the development of autonomous driving technology, attempts are being made to use robots to surveil or patrol in places or times that humans cannot patrol in person.

For day/night patrol using a mobile robot capable of autonomous driving, a system that combines a mobile robot with a surveillance camera is mainly used. As a surveillance camera, a PTZ (Pan, Tilt and Zoom) camera, an omnidirectional camera, a thermal imaging camera, etc. are used.

However, since the autonomous driving robot mainly moves using wheels, there is a limit to the area and speed it can patrol. Also, since the robot travels on the ground, there is a limit to the surveillance range using a camera.

In order to compensate for the limits of such a mobile robot, attempts are being made to utilize a drone as a micro flight device.

However, drones that are made small and lightweight for flight have a problem in that their operating time is shortened due to battery capacity. Also, there are some areas where flying of drones is prohibited, such as airports and nuclear power plants, and there are limits to surveil using drones because flying at night is prohibited for safety reasons.

The inventors of the present invention have made research efforts to solve the problem of the surveillance method using a conventional robot. Through much efforts, the present invention related to a surveillance system that can overcome the limits of a mobile robot and a drone by using the mobile robot and the drone at the same time has been completed.

SUMMARY OF THE INVENTION

It is an object of the present invention to provide a surveillance system capable of making up for the limit of a surveillance range of a mobile robot by using a drone in a surveillance system using a mobile robot.

Meanwhile, other objects not specified in the present invention will be further considered within the scope that can be easily inferred from the following detailed description and effects thereof.

A mobile security robot equipped with a micro flight device according to the present invention includes a travelling unit that enables the mobile security robot to travel on a ground; a camera that surveils surrounding; a storage that stores a micro flight device; a charger that charges a battery of the micro flight device; a communicator that communicates with the micro flight device or a control center; and a controller that includes one or more processors and a memory and controls a movement of the robot or a movement of the micro flight device.

The traveling unit is a caterpillar track.

The camera includes at least one of a PTZ (Pan-Tilt-Zoom) camera, a 360-degree camera capable of omnidirectional shooting, and a thermal imaging camera.

The charger is capable of wireless charging of the micro flight device.

The controller controls the micro flight device mounted on the storage to fly if it is determined that a location is inaccessible by the traveling unit.

A method for controlling a mobile security robot equipped with a micro flight device according to another embodiment of the present invention, includes the steps of (a) receiving patrol target location information; (b) determining whether a patrol target location is a location where the mobile security robot is able to travel; (c) determining whether it is the location where the mounted micro flight device is able to fly if it is determined as the location where the mobile security robot is not able to travel; and (d) controlling the micro flight device to patrol if it is determined as the location where the micro flight device is able to fly.

The method further includes, after the step (b), the step of further determining whether it is the location where the micro flight device is able to fly if it is determined as the location where the mobile security robot is able to travel, and controlling the mobile security robot and the micro flight device to patrol at the same time.

In the step (c), it is determined whether it is the location where the micro flight device is able to fly, by at least one of a status of a battery, available flight area and available flight time of the micro flight device.

A system for controlling a mobile security robot equipped with a micro flight device comprises a processor for performing the steps of: (a) receiving patrol target location information; (b) determining whether a patrol target location is a location where the mobile security robot is able to travel; (c) determining whether it is the location where the mounted micro flight device is able to fly if it is determined as the location where the mobile security robot is not able to travel; and (d) controlling the micro flight device to patrol if it is determined as the location where the micro flight device is able to fly.

The system, further comprises, after the step (b), the step of further determining whether it is the location where the micro flight device is able to fly if it is determined as the location where the mobile security robot is able to travel, and controlling the mobile security robot and the micro flight device to patrol at the same time.

The system, wherein in the step (c), it is determined whether it is the location where the micro flight device is able to fly, by at least one of a status of a battery, available flight area and available flight time of the micro flight device.

It is stated that the accompanying drawings are exemplified as a reference for understanding the technical spirit of the present invention, and the scope of the present invention is not limited thereby.

DETAILED DESCRIPTION OF THE INVENTION

Hereinafter, with reference to the drawings, the configuration of the present invention guided by various embodiments of the present invention and effects resulting from the configuration will be described. In the description of the present invention, if it is determined that the subject matter of the present invention may be unnecessarily obscured as it is obvious to those skilled in the art with respect to related known functions, the detailed description thereof will be omitted.

Terms such as 'first' and 'second' may be used to describe various components, but the components should not be limited by the above tams. The above term may be used only for the purpose of distinguishing one component from another. For example, without departing from the scope of the present invention, a 'first component' may be referred to as a 'second component', and similarly, a 'second component' may also be referred to as a 'first component'. Also, expressions in the singular include plural expressions unless the context clearly dictates otherwise. Unless otherwise defined, terms used in the embodiments of the present invention may be interpreted as meanings commonly known to those of ordinary skill in the art.

Hereinafter, with reference to the drawings, the configuration of the present invention guided by various embodiments of the present invention and effects resulting from the configuration will be described.

Figure 1:
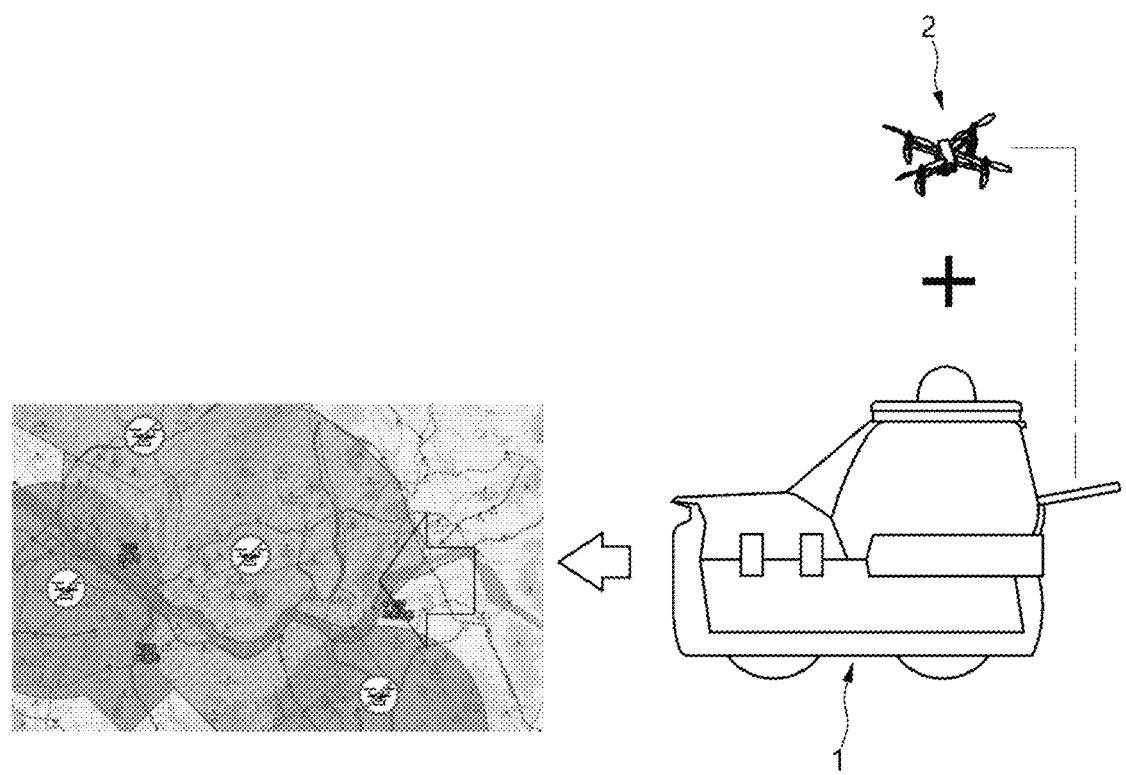
FIG. 1 is a configuration example of a mobile security robot equipped with a micro flight device according to a preferred embodiment of the present invention.

FIG. 1 is a configuration example of a mobile security robot equipped with a micro flight device according to a preferred embodiment of the present invention.

The mobile security robot 1 according to the present invention can patrol a designated area by mounting a micro flight device 2 such as a drone thereon.

The mobile security robot 1 is equipped with a moving means such as wheels or a caterpillar (crawler track) or legs (2-legged, 4-legged) to patrol a predetermined area.

However, in an area inaccessible by the mobile security robot 1, instead, the patrol is performed using the micro flight device 2. To this end, the mobile security robot 1 may include a mounting space and charging facility for the micro flight device 2.

Figure 2:
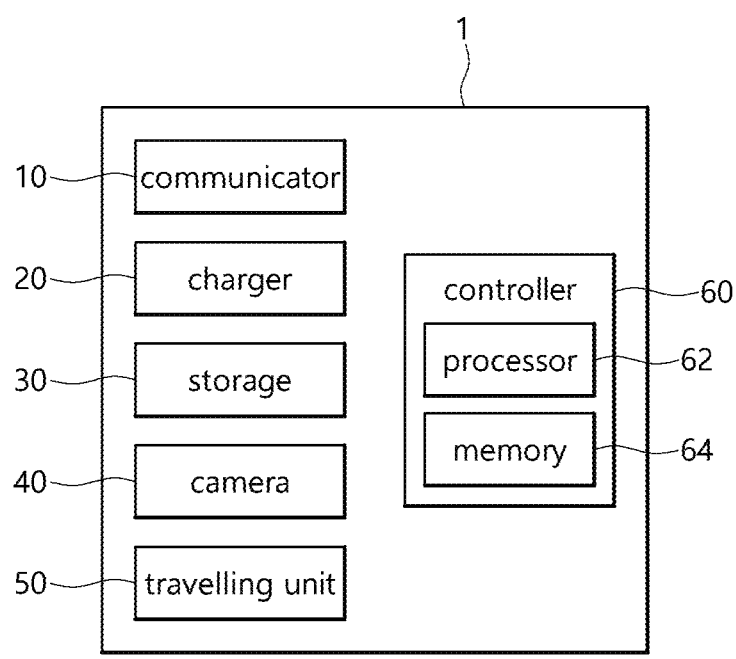
FIG. 2 is a schematic configuration diagram of a mobile security robot equipped with a micro flight device according to a preferred embodiment of the present invention.

FIG. 2 is a schematic configuration diagram of a mobile security robot equipped with a micro flight device according to a preferred embodiment of the present invention.

The mobile security robot 1 may include a communicator 10, a charger 20, a storage 30, a camera 40, a traveling unit 50, and a controller 60.

The traveling unit 50 is used to move the mobile security robot 1. The travelling unit 50 may be in the form of a wheel or in the form of a caterpillar, and may be in the form of a leg for quadruped or bipedal walking.

However, there is a limit to the terrain or distance where the traveling unit 50 of the mobile security robot 1 cannot make a movement. It will be impossible for the mobile security robot 1 to access the terrain such as rivers or valleys, and in a case where there are obstacles such as stairs or walls, the mobile security robot 1 cannot travel and therefore circumstances arise where patrol cannot be carried out.

Therefore, the mobile security robot 1 according to the present invention is equipped with a micro flight device such as a drone to make up for the patrol range.

To this end, the mobile security robot 1 includes the storage 30 for mounting a micro flight device and the charger 20 for charging when the micro flight device is mounted.

The storage 30 is configured to be opened and closed and can protect the micro flight device from external shocks or dust, etc. while the micro flight device is mounted therein. In addition, the storage 30 may be mounted with two or more micro flight devices.

In the micro flight device such as a drone, the battery capacity is inevitably limited due to its weight. Therefore, the charging can be performed through the charger 20 while the micro flight device is mounted on the mobile security robot 1. Since accurate contact may be difficult due to the nature of the micro flight device, the charger 20 may support wireless charging or may use a magnetic charging method.

The camera 40 is used to collect information on the surrounding while the mobile security robot 1 is patrolling. In order to surveil a wide range by the mobile security robot 1, the camera 40 may be configured as a PTZ (Pan, Tilt and Zoom) camera, a 360-degree camera capable of omnidirectional shooting, etc. The camera 40 may also be configured as a thermal imaging (infrared) camera for nighttime, low-light photography.

The controller 60 includes one or more processors 62 and a memory 64 to control the patrol of the mobile security robot 1 and the micro flight device mounted on the mobile security robot 1.

To this end, the processor 62 performs instructions for controlling the mobile security robot 1, and stores instruction codes and data for driving the processor 62 in the memory 64. In addition, it is possible to send and receive control signals or data to and from the micro flight device or the control center through the communicator 10.

The controller 60 controls the patrol of the mobile security robot 1 and the micro flight device by determining the travelable area of the mobile security robot 1 and the flightable area of the micro flight device, respectively.

For the determination, the controller 60 receives information such as a map of a patrol target location from the user.

Figure 3:
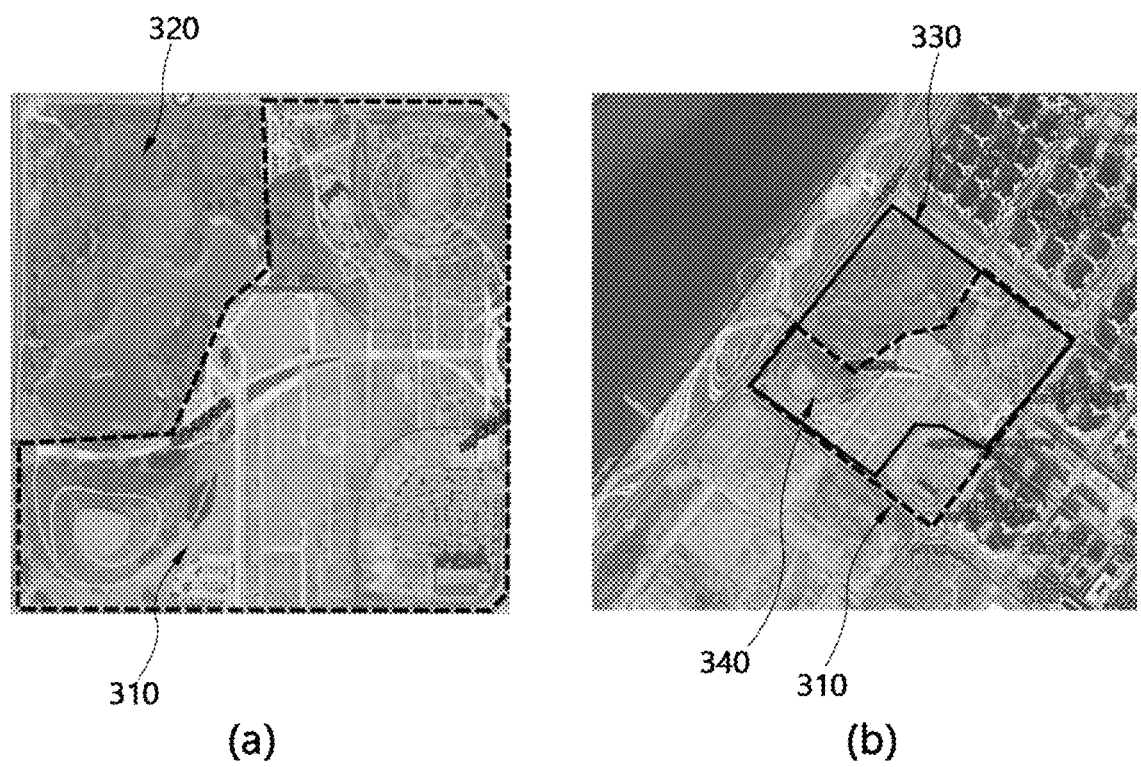
FIG. 3 shows an example of a patrol area using a mobile security robot equipped with a micro flight device according to a preferred embodiment of the present invention.

FIG. 3 shows an example of a received patrol area.

In (a) of FIG. 3, a patrol area 310 of the mobile security robot 1 is indicated by a dotted line, and the movement of the mobile security robot 1 is controlled by this information. The area 320 outside the dotted line indicates an area that cannot be accessed by the mobile security robot, such as a lake or a mountainous terrain.

In FIG. 3, (b) shows an example of a patrol area by the mobile security robot 1 and a patrol area by the micro flight device.

The area 310 indicated by a dotted line indicates an area that can be patrolled by the mobile security robot 1, and the area 330 indicated by a solid line indicates an area that can be patrolled by the micro flight device. The common area 340 indicated by a dotted line and a solid line will be an area where joint patrolling of the mobile security robot 1 and the micro flight device is possible.

Based on such information, the controller 60 may control the autonomous driving of the mobile security robot 1. If necessary, the controller 60 may receive the instruction for controlling the traveling of the mobile security robot 1 according to the surrounding environment identified by the user through the camera 40 from a control center or the like.

The information received by the controller 60 may include available flight time information, etc. independent of the map. It is because there may be a regulation such as prohibiting flight after sunset may exist for the micro flight device. In addition, location information such as airports and major facilities where flights are completely banned can also be determined.

In addition to the information received from the user, the controller 60 may determine whether patrolling is possible based on information obtained by the camera 40 and various sensors (not shown). If the flight of the micro flight device or the travelling of the mobile security robot 1 is restricted due to a construction site not shown on the map or weather changes such as rain, snow, or wind, it may be determined as a patrol impossible area.

The controller 60 may control the mobile security robot 1 to continue patrolling even while the micro flight device is in flight. In this case, the location information of the mobile security robot 1 is continuously transmitted to the micro flight device for the return of the micro flight device.

In this way, if the mobile security robot is equipped with the micro flight device and used for patrolling, it is possible to patrol the places where the mobile security robot cannot access with the micro flight device, so there is the advantage of expanding the patrol area.

Figure 4:
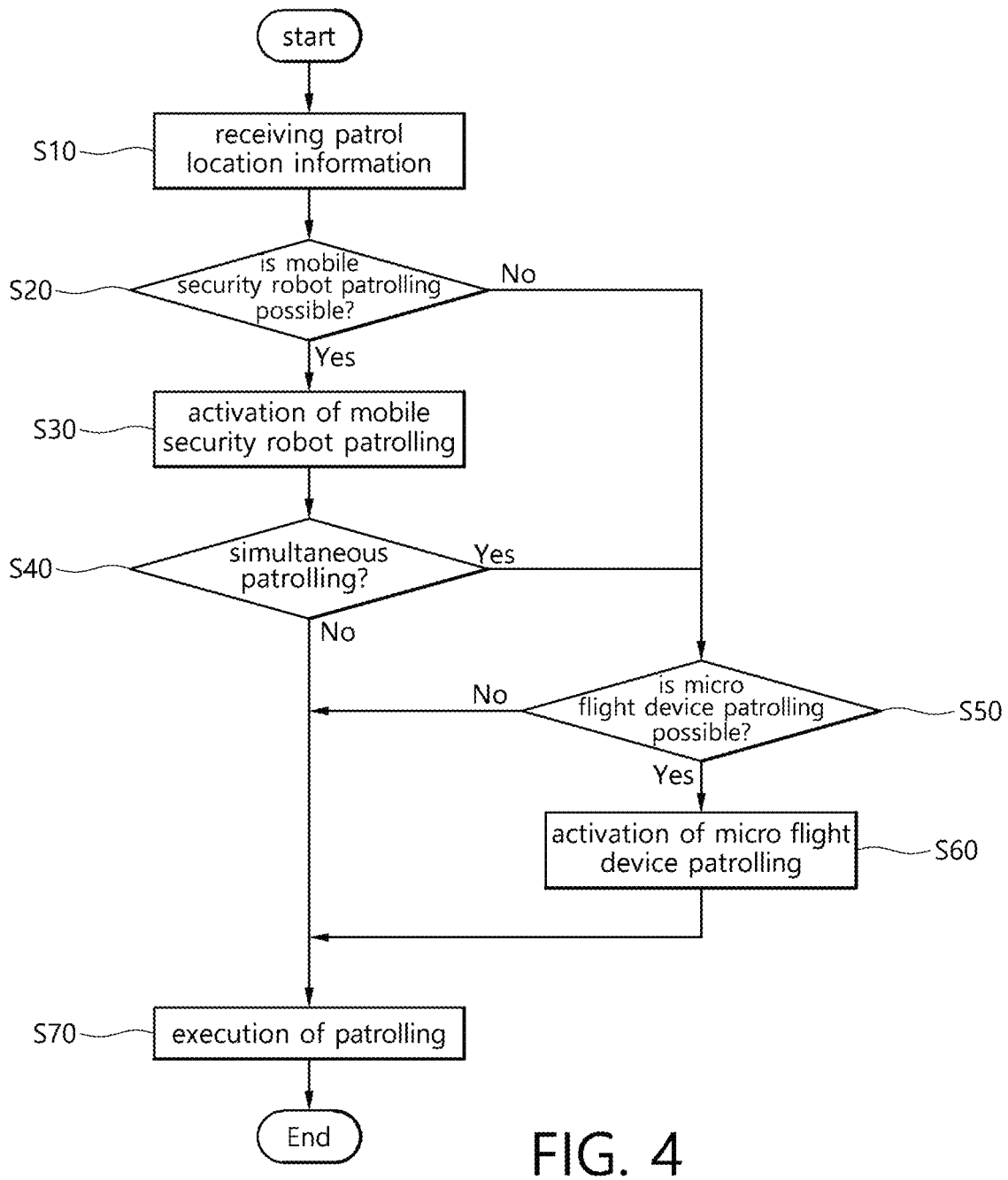
FIG. 4 is a flowchart of a method for controlling a mobile security robot equipped with a micro flight device according to another preferred embodiment of the present invention.

FIG. 4 is a flowchart of a method for controlling a mobile security robot equipped with a micro flight device according to another preferred embodiment of the present invention.

A method for controlling a mobile security robot according to the present invention is performed by the controller including one or more processors and a memory.

First, the information on a patrol location is received from a user (S10).

As in the example of FIG. 3, the map information of the patrol location and the patrol area may be displayed in the form of a geo-fence.

The geo-fence information may be set by the user in the control center, and if information such as a no-fly area is stored in a server designated in advance, it may be utilized.

It is determined whether the mobile security robot can patrol using the received information (S20).

Whether it is possible to patrol can be determined using information such as geo-fence information or topographical features. Alternatively, it may be possible to determine whether it is possible to patrol using the information obtained from the camera or sensor mounted on the mobile security robot.

If the patrolling of the mobile security robot is possible, the patrolling of the mobile security robot may be activated to control the mobile security robot to patrol the corresponding position (S30).

If the patrolling of the mobile security robot is impossible, it may be determined whether the patrolling of the micro flight device (drone) is possible, instead (S50).

In order to determine whether the patrolling of the micro flight device is possible, it is necessary to check the status of the battery, an available flight area, and an available flight time. Since the flight time varies depending on the status of the battery, the available flight distance may be limited. Even in an operable flight location, flight may be restricted near important facilities due to legal restrictions, etc., and after sunset, factors such as restrictions on the flight of the micro flight device should be also considered. In addition, the case where flight is impossible due to weather conditions such as strong winds, storm or electromagnetic waves should be considered.

If it is determined that the patrolling by the micro flight device is possible by taking into account various factors, the patrolling of the micro flight device is activated (S60) and the patrolling is executed (S70).

Even if the patrolling of the mobile security robot is possible (S30), it can determine whether joint patrolling of the mobile security robot and the micro flight device is possible by examining whether there is an area such as the joint patrol area 340 of FIG. 3 (S40).

If the mobile security robot and the micro flight device are used at the same time, the patrol area can be expanded and the patrol time can be shortened by patrolling the same area at the same time.

If it is an area where simultaneous patrolling is possible, it is determined whether the patrolling of the micro flight device is possible (S50), and if possible, the mobile security robot and the micro flight device are controlled to execute patrolling together (S70), and if simultaneous patrolling is not possible, only the mobile security robot is controlled to execute patrolling (S70).

According to the mobile security robot equipped with the micro flight device and the control method thereof of the present invention described above, by making up for the limits in the patrol area according to the travelling method of the mobile security robot and executing the flight patrolling by the micro flight device, it has the advantage of being able to patrol a much wider area in a shorter time, compared to the conventional patrol with only mobile security robot.

According to the present invention, by using a mobile robot and a drone at the same time, the limit of the surveillance range of the mobile robot can be overcome using the drone, and there is an effect of performing the surveillance by the mobile robot in an area where the drone cannot fly or at night time.

On the other hand, even if it is an effect not explicitly mentioned herein, it is also noted that the effects described in the following specification expected by the technical features of the present invention and their potential effects are treated as if they were described in the specification of the present invention.

The protection scope of the present invention is not limited to the description and expression of the embodiments explicitly described above. In addition, it is added once again that the protection scope of the present invention cannot be limited by obvious changes or substitutions in the technical field to which the present invention pertains.

What is claimed is:

1. A mobile security robot equipped with a micro flight device, the mobile security robot comprising:
   a travelling unit configured to enable the mobile security robot to travel on a ground;
   a camera configured to surveil a surrounding of the mobile security robot;
   a storage configured to store the micro flight device;
   a charger configured to charge a battery of the micro flight device;
   a communicator configured to communicate with the micro flight device or a control center; and
   a controller including one or more processors and a memory and configured to control a movement of the mobile security robot or a movement of the micro flight device, wherein the controller is configured to:
determine whether a patrol target location is a location where the mobile security robot is unable to travel based on a map including information related to an area where the mobile security robot is able or unable to travel;
determine whether the micro flight device is able to fly to the patrol target location based on a map including information related to an area where the micro flight device is allowed or prohibited to fly and a status of a battery of the micro flight device, and an available flight time period in which the micro flight device is allowed to fly, and
if determining that the patrol target location is the location where the mobile security robot is unable to travel and the micro flight device is allowed to fly and patrol time of the micro flight device is within the available flight time period in which the micro flight device is allowed to fly, control the micro flight device mounted at the storage to fly to patrol the patrol target location.

2. The mobile security robot according to claim 1, wherein the traveling unit is a caterpillar track.

3. The mobile security robot according to claim 1, wherein the camera includes at least one of a PTZ (Pan-Tilt-Zoom) camera, a 360-degree camera capable of omni-directional shooting, and a thermal imaging camera.

4. The mobile security robot according to claim 1, wherein the charger is configured to wireless charge the micro flight device.

5. The mobile security robot according to claim 1, wherein the controller is configured to, if determining that the patrol target location is the location where the mobile security robot is able to travel and the micro flight device is allowed to fly and the patrol time of the micro flight device is within the available flight time period in which the micro flight device is allowed to fly, control the mobile security robot and the micro flight device to jointly patrol the patrol target location.

6. A method for controlling a mobile security robot equipped with a micro flight device, the method comprising:
receiving patrol target location information;
determining whether a patrol target location is a location where the mobile security robot is able to travel;
determining whether the patrol target location is the location where the mounted micro flight device is able to fly if it is determined that the patrol target location is the location where the mobile security robot is not able to travel;
determining whether the micro flight device is able to fly to the patrol target location based on a map including information related to an area where the micro flight device is allowed or prohibited to fly and a status of a battery of the micro flight device, and an available flight time period in which the micro flight device is allowed to fly, and
controlling the micro flight device to patrol if it is determined that the patrol target location is the location where the micro flight device is able to fly and the micro flight device is allowed to fly and patrol time of the micro flight device is within the available flight time period in which the micro flight device is allowed to fly,
wherein the determining of whether the patrol target location is the location where the mobile security robot is able to travel comprises determining whether the patrol target location is the location where the mobile security robot is able to travel based on a map including information related to an area where the mobile security robot is able or unable to travel.

7. The method according to claim 6, further comprising, after the of the determining of whether the patrol target location is the location where the mobile security robot is able to travel, further determining whether the patrol target location is the location where the micro flight device is able to fly if it is determined that the patrol target location is the location where the mobile security robot is able to travel, and controlling the mobile security robot to patrol the patrol target location and the micro flight device to fly to the patrol target location at the same time.

8. The method according to claim 6, wherein the determining of whether the patrol target location is the location where the mounted micro flight device is able to fly comprises determining whether the patrol target location is the location where the micro flight device is able to fly based on a status of a battery, an available flight area and the available flight time period of the micro flight device.

9. The method according to claim 6, further comprising, if determining that the patrol target location is the location where the mobile security robot is able to travel and the micro flight device is allowed to fly and the patrol time of the micro flight device is within the available flight time period in which the micro flight device is allowed to fly, controlling the mobile security robot and the micro flight device to jointly patrol the patrol target location.

10. A system for controlling a mobile security robot equipped with a micro flight device, the system comprising a processor configured to:
receive information related to a patrol target location;
determine whether the patrol target location is a location where the mobile security robot is able to travel;
determine whether the patrol target location is the location where the mounted micro flight device is able to fly if it is determined that the patrol target location is the location where the mobile security robot is not able to travel;
determine whether the micro flight device is able to fly to the patrol target location based on a map including information related to an area where the micro flight device is allowed or prohibited to fly and an available flight time period in which the micro flight device is allowed to fly; and
control the micro flight device to patrol if it is determined that the patrol target location is the location where the mobile security robot is unable to travel and the micro flight device is allowed to fly and patrol time of the micro flight device is within the available flight time period in which the micro flight device is allowed to fly,
wherein the processor is further configured to determine whether the patrol target location is the location where the mobile security robot is unable to travel based on a map including information related to an area where the mobile security robot is able or unable to travel.

11. The system according to claim 10, wherein the processor is further configured to, after the controlling of the micro flight device to patrol, determine whether the patrol target location is the location where the micro flight device is able to fly if it is determined that the patrol target location is the location where the mobile security robot is able to travel, and control the mobile security robot to patrol the patrol target location and the micro flight device to fly to the patrol target location at the same time.

12. The system according to claim 10, wherein the processor is configured to determine whether the patrol target location is the location where the micro flight device is able to fly based on a status of a battery, an available flight area and the available flight time period of the micro flight device.

13. The system according to claim 10, wherein the controller is configured to, if determining that the patrol target location is the location where the mobile security robot is able to travel and the micro flight device is allowed to fly and the patrol time of the micro flight device is within the available flight time period in which the micro flight device is allowed to fly, control the mobile security robot and the micro flight device to jointly patrol the patrol target location.

* * * * *